US010701166B2

(12) United States Patent
Mittal et al.

(10) Patent No.: US 10,701,166 B2
(45) Date of Patent: Jun. 30, 2020

(54) AUTOMATED APPLICATION LINKING

(71) Applicant: Microsoft Technology Licensing, LLC, Redmond, WA (US)

(72) Inventors: Manish Mittal, Redmond, WA (US); Aman Singhal, Bellevue, WA (US); Marcelo Medeiros De Barros, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 15/462,226

(22) Filed: Mar. 17, 2017

(65) Prior Publication Data

US 2018/0219963 A1    Aug. 2, 2018

Related U.S. Application Data

(60) Provisional application No. 62/452,812, filed on Jan. 31, 2017.

(51) Int. Cl.
*G06F 15/16* (2006.01)
*H04L 29/08* (2006.01)
*G06F 16/951* (2019.01)
*G06F 15/173* (2006.01)

(52) U.S. Cl.
CPC ........ *H04L 67/2804* (2013.01); *G06F 16/951* (2019.01); *H04L 67/02* (2013.01); *H04L 67/34* (2013.01)

(58) Field of Classification Search
CPC ............................ H04L 67/2804; H04L 67/02
USPC ........................................................ 709/217
See application file for complete search history.

(56) References Cited

U.S. PATENT DOCUMENTS

| 8,762,360 | B2 | 6/2014 | Jiang et al. |
| 9,311,168 | B1 | 4/2016 | Lewis et al. |
| 9,448,776 | B1* | 9/2016 | Sankaran ............. G06F 16/972 |
| 2010/0114908 | A1 | 5/2010 | Chand et al. |
| 2011/0264673 | A1 | 10/2011 | White et al. |
| 2012/0124061 | A1 | 5/2012 | Macbeth et al. |
| 2012/0124062 | A1 | 5/2012 | Macbeth et al. |
| 2013/0031079 | A1 | 1/2013 | El daher et al. |
| 2014/0164909 | A1* | 6/2014 | Graff .................... G06F 16/957 715/234 |

(Continued)

OTHER PUBLICATIONS

Park, et al., "Mobile App Retrieval for Social Media Users via Inference of Implicit Intent in Social Media Text", In Proceedings of the 25th ACM International on Conference on Information and Knowledge Management, Oct. 24, 2016, 10 Pages.

(Continued)

*Primary Examiner* — Karen C Tang

(57) ABSTRACT

Unique application identification (UAID) stamping for automated classification of an implicit query as an application intent query from web results for enabling improved delivery of applications as a search result is provided. An application indexing engine identifies web resources related to an app, and tags the resources with a unique application identifier associated with the app. Accordingly, an implicit query where a web resource responsive to the query is related to the app triggers classification of the query as an app-intent query, enabling the app to be provided as an app result in response to the query. The app is presented to a user, who may selectively download the app.

16 Claims, 10 Drawing Sheets

(56) References Cited

U.S. PATENT DOCUMENTS

| | | | |
|---|---|---|---|
| 2014/0250098 A1 | 9/2014 | Kasterstein et al. | |
| 2015/0156061 A1 | 6/2015 | Saxena et al. | |
| 2015/0286737 A1* | 10/2015 | Cattone | G06F 3/04842 |
| | | | 715/234 |
| 2015/0379128 A1* | 12/2015 | Chang | G06F 16/951 |
| | | | 707/711 |
| 2016/0188130 A1 | 6/2016 | Harris et al. | |
| 2016/0306801 A1* | 10/2016 | Andrianakou | G06F 16/24578 |
| 2016/0321052 A1 | 11/2016 | Sharifi et al. | |
| 2016/0330150 A1* | 11/2016 | Joe | H04L 51/046 |
| 2016/0357716 A1 | 12/2016 | Douglas et al. | |
| 2017/0046180 A1* | 2/2017 | Desineni | G06F 9/44521 |
| 2017/0131988 A1* | 5/2017 | Boudville | G06F 16/95 |
| 2017/0195395 A1* | 7/2017 | Weisman | G06F 16/9566 |
| 2017/0351693 A1* | 12/2017 | Boudville | G06F 17/2235 |
| 2017/0357721 A1* | 12/2017 | Chernenkov | G06F 16/9566 |
| 2019/0197077 A1* | 6/2019 | Li | H04L 67/36 |
| 2019/0253503 A1* | 8/2019 | Austin | G06F 16/953 |

OTHER PUBLICATIONS

"Android Deep Linking", http://web.archive.org/web/20141215011852/http:/docs.urbanairship.com/topic-guides/android-deep-linking.html, Dec. 15, 2014, 6 Pages.

"International Search Report and Written Opinion Issued in PCT Application No. PCT/US2018/014610", dated Mar. 9, 2018, 11 Pages.

* cited by examiner

122

Cruiser.com – Official Site
https://www.cruiser.com
CRUISER searches hundred of travel sites at once to find the information that you need to make informed choices on flights, hotels, and rental cars.

| Flights | — 302a |

Search with Cruiser for cheap flights and find the lowest cost airline rates ...

| Hotels | — 302b |

Search with Cruiser for low cost hotels and find the hotel deal that is cheapest ...

| Cars | — 302c |

Let Cruiser find the perfect vehicle for your vacation needs, from price to size to ...

| Packages | — 302d |

Search with Cruiser for vacation packages and find the best deals for getaways ...

| Explore | — 302e |

Need a getaway? Input a budget and trip type an be prepared to be swept away ...

| Help | — 302f |

Cruiser Help: Learn more about Cruiser and our services, or contact a friendly ...

FIG. 3A

//AUTOMATED APPLICATION LINKING

CROSS-REFERENCE TO RELATED APPLICATIONS

This application claims the benefit of U.S. Provisional Application No. 62/452,812, filed Jan. 31, 2017, and titled "AUTOMATED APPLICATION LINKING," which is incorporated herein by reference.

BACKGROUND

More and more enterprises have dedicated applications (app or apps) for certain platforms (e.g., mobile, desktop, tablet, wearable device, television). Apps serve many functions. For example, they can provide general information, prices, booking forms, search features, user accounts, messengers, news feeds, and much more.

When using a search engine, a user may input an explicit app-related query, where the user's intent is to receive a query result including the app belonging to an explicitly-defined enterprise or an app related to a category. For example, the user may input "ABC app," wherein "ABC" is the enterprise's name. Accordingly, if the enterprise has an app, the search engine will likely return an application result (e.g., a link to an app that the user can download) for such a query. As another example, the user may input "weather application." Accordingly, the search engine will likely return application results that relate to the category "weather."

In another example, the user may input an implicit category query, where the user does not explicitly specify "app." The user may or may not be aware that there is an app available that is associated with the query. For example, the user may input "flight booking." The search engine may return deep link resource results, which are web resources whose addresses include a path (e.g., https://example.com/path) rather than only the resource's homepage (e.g., https://example.com). Currently, deep link resources are not linked to a related app, unless the developer of the app has manually associated the app with the deep link resource. Accordingly, when an implicit app category query is performed, the results oftentimes do not include app results. As can be appreciated, it is desirable to provide automated linking of an app to a related web resource for enabling responsive and consistent delivery of apps as search results responsive to implicit category queries.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

In this disclosure, automated discovery and linking of an app to a related web resource for improved delivery of apps as a search result are described. Aspects are directed to an automated system, computer-implemented method, and computer storage medium for providing unique application identifier (UAID) stamping for enabling automated classification of an implicit query as an app-intent query, and thus providing improved delivery of applications as a search result. For example, an application linking engine is provided for identifying web resources related to an app, and tagging the resources with a UAID associated with the app. Accordingly, an implicit query where a web resource responsive to the query is related to the app triggers classification of the query as an app-intent query, enabling the app to be provided as an app result in response to the query. The app is presented to a user who may selectively download the app. By providing app results for an implicit query, a user is advantageously enabled to receive responsive and consistent delivery of apps as a search result response to implicit category queries. Computing efficiency is increased due to faster and more accurate app search results responsive to implicit queries.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 3A is an illustration showing an example web resource and segments of the resource;

DETAILED DESCRIPTION

Figure 1:
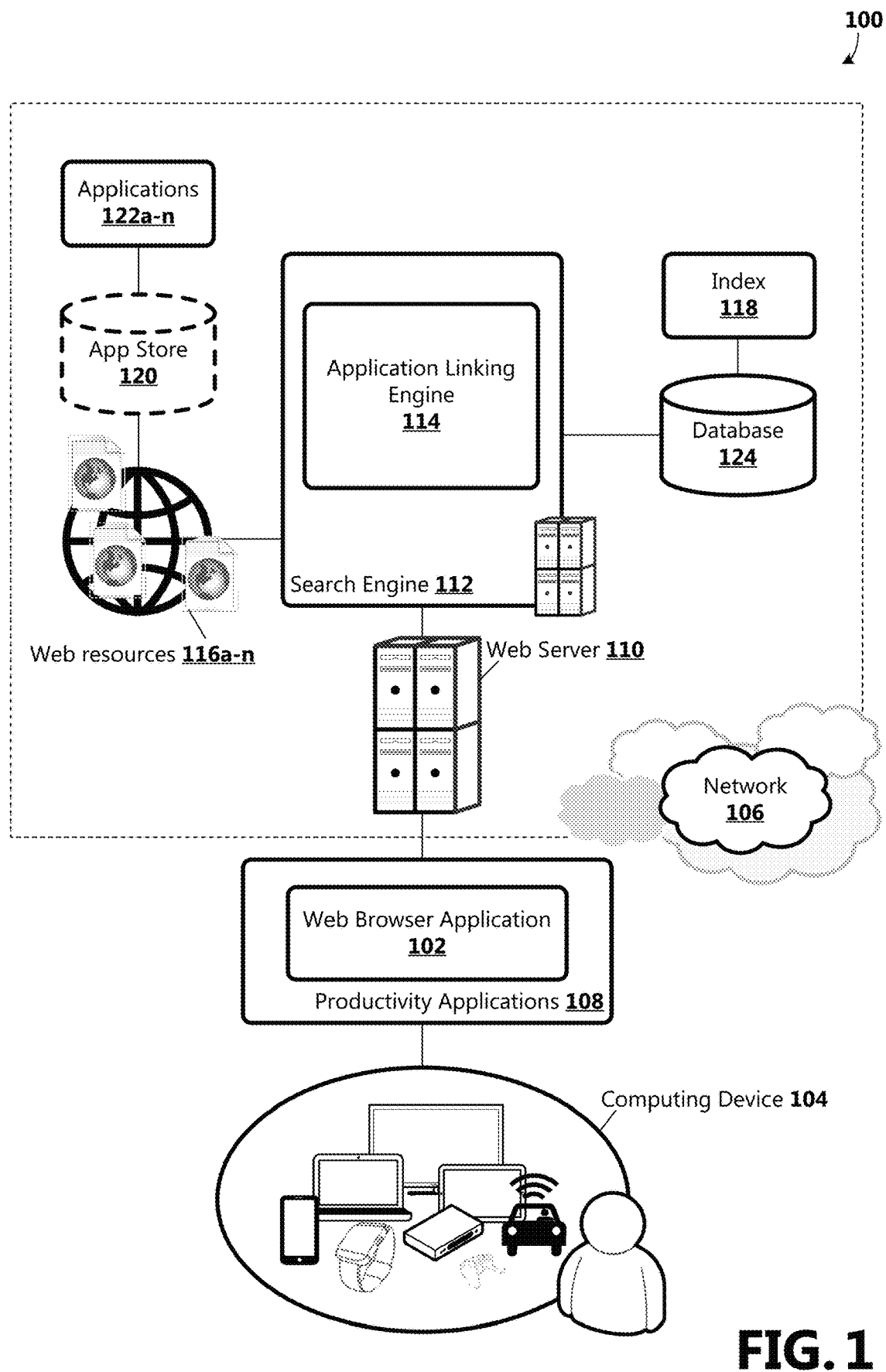
FIG. 1 is an illustration of an example operating environment in which automated discovery and linking of an app to a related web resource for improved delivery of apps as a search result is provided.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

With reference now to FIG. 1, a simplified block diagram illustrating aspects of an example operating environment 100, in which automated discovery and linking of an app to a related web resource for improved delivery of apps as a search result is shown. The example operating environment 100 includes a computing device 104. The computing device 104 may be one of various types of computing devices for executing applications for performing a variety of tasks. Non-limiting examples of suitable computing devices 104 include desktop computers, laptop computers, tablet computers, laptop/tablet hybrid computing devices, large screen multi-touch displays, mobile phones, personal digital assistants, wearable devices, gaming devices, connected automobiles, and smart appliances. Although examples are illustrated as displayed on a mobile computing device, it should be appreciated that the illustrated examples are not intended to be limiting of the various types of suitable computing devices 104 which may be used to provide application linking as described herein.

The example operating environment 100 includes one or more productivity applications 108. Examples of suitable productivity applications 108 include, but are not limited to, word processing, spreadsheet, database, slide presentation, electronic mail, drawing, note taking, web browser 102, media player, contacts, and game applications. In some examples, the productivity application(s) 108 are web applications operated on a server and provided via an online service, for example, a portal-based computing system for creating, managing and sharing electronic documents.

According to an aspect, a web browser application 102 is illustrative of a software module operative to retrieve and display content (web resources 116a-n, collectively 116) available on a network 106 or a combination of networks (e.g., the Internet, wide area networks, local area networks). For example, as a client/server model, the web browser application 102 is the client executing on the computing device 104 that contacts a web server 110 for requesting information. The web server 110 is illustrative of a software module, system, or device operative to receive a request, and using a particular protocol (e.g., Hypertext Transfer Protocol (HTTP)), serves web resources 116 to the web browser application 102 responsive to the received request. The web resources 116 that may be browsed can be in the form of textual content on a web page, an image, a video, audio, etc. A user may input a URL (Uniform Resource Locator) or select an element that is linked to a URL, wherein the URL serves as an address of a web resource 116 that specifies the resource's location on the network 106 and oftentimes a mechanism (protocol) for retrieving it. According to aspects, an application 122a-n (collectively 122) is an example of a web resource 116. In some examples, an application (app) 122 is stored in an app store database 120. An app 122 may be offered as a downloadable resource which can be installed on the user's computing device 104.

According to examples, the user may input or select a URL of a search engine 112 that is operative to search for web resources 116 based on keywords entered by the user. The search engine 112 is operative to query an index 118 to locate the information for which the user is searching. According to an aspect, the index 118 is stored in one or more databases 124, and comprises data that the search engine 112 has collected, parsed, and stored. For example, the search engine 112 uses automated computer programs that browse a network 106 in a methodical and automated manner to extract information from web resources 116 they have visited, such that the search engine can then index the resources to create web site listings that facilitate faster searches. According to examples, the user types a query into the search engine 112, and the search engine queries the index 118 in its one or more databases 124 to find a match to the specific query. The search engine 112 then produces the results to the query in a ranked order according to relevancy.

Results to a query can include one or more web resource 116 results. In examples, the one or more web resource 116 results can include resources that have homepage links or deep links. As used herein, a homepage link is a URL that links to a web resource homepage and does not include a folder path or webpage file, such as an HTML (Hypertext Markup Language) file or an HTML page including one or more scripts (e.g., an ASPX (Active Server Page Extended) file). For example, a homepage link is oftentimes comprised of a communication protocol (e.g., http) and a webserver domain name (e.g., http://www.example.com). As used herein, a deep link is a URL that includes information needed to point to a particular item, for example, internal pages of a website. A deep link web resource 116 may have a URL that includes a path (e.g., https://www.example.com/path), rather than only the webserver domain name or homepage address (e.g., http://www.example.com). Further, results to a query can include one or more apps 122. The one or more app 122 results may be displayed intermixed with other web resource 116 results, or may be displayed separately.

In some examples, a user may input keywords into a search engine user interface (UI) displayed on the user's computing device 104, wherein a keyword includes "app" or "application," and therefore does not require interpretation for further meaning. Accordingly the query is determined to be an explicit app-related query, where a determination is made that the user's intent is to receive an app query result. The explicit app-related query may include at least a portion of a particular webserver domain name, or may include a category. One example of an explicit app-related query is <company application>, wherein "company" is the name of a particular enterprise, product, or service. Another example of an explicit app-related query is <category application>, wherein "category" is a category of an app 122, such as weather, bank, game, budget, etc. Responsive to a query determined to be an explicit app-related query, the search engine 112 is operative to query the index 118 to locate web resources 116, including apps 122, based on the keywords entered by the user, and to provide the web resource results and app results to the user via the web browser application 102.

In other examples, a user may input keywords into a search engine user interface (UI) displayed on the user's computing device 104, wherein the keywords do not explicitly specify "app" or "application." For example, the user may enter <hotel booking>. The query may be determined to be an implicit category query, where a determination is made that the user's intent is to receive web resources 116 related to "hotel" and "booking." Oftentimes, query results include web resources 116 that are internal pages of a website. For example, web resource 116 results for a <hotel booking> query may include a hotel page of a travel website, wherein the URL for the resource is a deep link (e.g., http://www.travelsite.com/hotels). In some examples, the user's intent is to receive app results for an implicit category query. For example, the user may wish to receive a query result including one or more apps 122 that the user can download to book a hotel. In other examples, the user may not be aware that an app 122 is available, but would be inclined to download and use the app if the user were apprised of the availability of the app.

To provide a responsive and consistent delivery of app results responsive to implicit category queries, aspects of the present disclosure include an application linking engine 114, illustrative of a software module, system, or device operative to identify a web resource 116 related to an app 122, and link the app to the resource for enabling improved delivery of apps 122 as search results. According to an aspect, the application linking engine 114 is operative to identify deep link web resources 116 related to an app 122, and link the app 122 to the deep link resource. According to an aspect, the search engine 112 comprises or is in communication with the application linking engine 114. In some examples, an application programming interface (API) is provided for enabling the search engine 112 to employ application linking via stored instructions. For example, the application linking engine 114 may be located on a remote server and accessed over a network 106.

Figure 2:
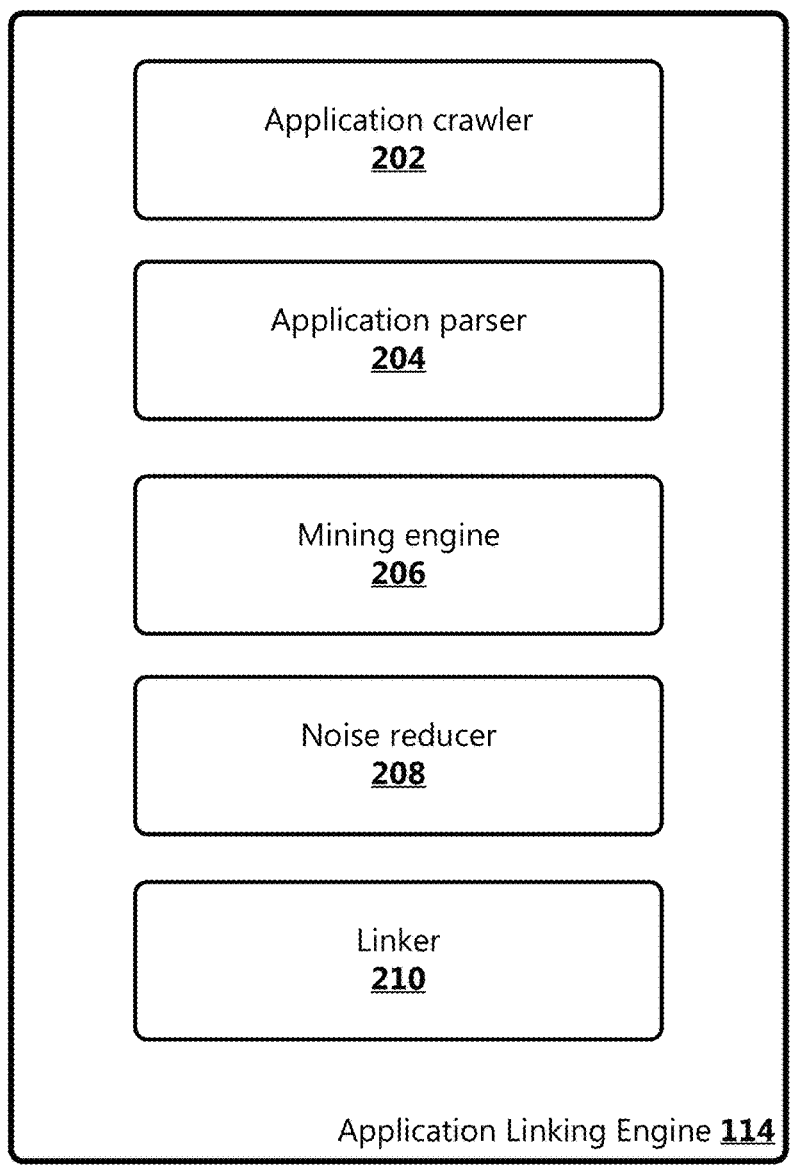
FIG. 2 is an illustration of components of an example application linking system.

With reference now to FIG. 2, various components of an example application linking engine 114 are illustrated. According to an aspect, the application linking engine 114 comprises an application crawler 202, illustrative of a software module, system, or device operative to crawl or browse the web or an app store database 120 to extract information from applications 122. According to an aspect, the application linking engine 114 further comprises an application parser 204. The application parser 204 is illustrative of a software module, system, or device operative to parse and index the extracted application information. For example, the application parser 204 may parse and index such information as: a unique app ID (UAID), an app name, a URL (e.g., developer website), ratings, related apps, description, developer, etc. According to an aspect, the parsed information is stored in index 118.

According to aspects, the application linking engine 114 further comprises or is in communication with a mining engine 206 illustrative of a software module, system, or device operative to identify deep links from a particular domain for determining whether the resource associated with the deep link should be linked to an app. In some examples, the mining engine 206 is operative to identify deep links using navigation (NAV) links 302a-n (collectively, 302) as illustrated in FIG. 3A. In other examples, the mining engine 206 follows a URL to its associated web resource 116, scrapes the resource for keywords and child resources (i.e., segments, tabs, or paths) within the resource, and stores the scraped data in the index 118. For example, a particular web resource 116 may be a parent resource or homepage link, and may have a plurality of child links, referred to sometimes herein as segments. Further a segment may have one or more child links, or sub-segments. Further still, a sub-segment may have one or more child links (or super-sub-segments), and a super-sub-segment may have one or more child links, and so-on. According to an aspect, each identified segment and child link therein is a deep link. For each identified deep link (i.e., segment and child link therein), the mining engine 206 is further operative to mine and index information from each web resource 116, and store the information in index 118. For example, an index entry for a particular web resource 116 (e.g., http://www.travelsite.com) may include its child links (e.g., http://www.travelsite.com/flights, http://www.travelsite.com/hotels, http://www.travelsite.com/cars), keywords scraped from the resource, and other metadata.

With reference again to FIG. 2, the application linking engine 114 further comprises a noise reducer 208. According to an aspect, the noise reducer 208 is illustrative of a software module, system, or device operative to determine whether a resource 116 is a noisy resource and thus should not be linked with an app 116. According to an example, a noisy resource may be determined based on keywords mined from the resource. A keyword may be weighted more depending on a number of occurrences or its location in the resource. For example, a noisy keyword in a title tag may have a higher weight than a noisy keyword within the content of the resource. Examples of noisy keywords include words such as: support, contact, about us, help, log in, sign-up, customer support, phone numbers, and addresses. As should be appreciated, the above examples are not limiting. Other noisy keywords are possible and are within the context of the present disclosure. For example and with reference again to FIG. 3A, the deep link associated with NAV link 302f may be determined to be a noisy resource based on the noisy keyword "help."

With reference again to FIG. 2, the application linking engine 114 further comprises a linker 210. The linker 210 is illustrative of a software module, system, or device operative to determine whether a non-noisy resource 116 is a webpage file, such as an HTML (Hypertext Markup Language) file or an ASPX (Active Server Page Extended) file. According to an aspect, the linker 210 is operative to link the UAID of the app 122 associated with the parent homepage URL to each non-noisy child resource 116 that is not a webpage file. In some examples, the linker 210 stamps or tags each non-noisy child resource 116 that is not a webpage file with the UAID. The tag or stamp is stored as metadata associated with the non-noisy child resource 116 in the index 118. Accordingly, when an implicit query is received, and results of the query include a non-noisy child resource, the search engine 112 is operative to classify the query as an app-intent query, and fetch the UAID from the index 118 for providing an associated app 122 resource as a query result.

Figure 3B:
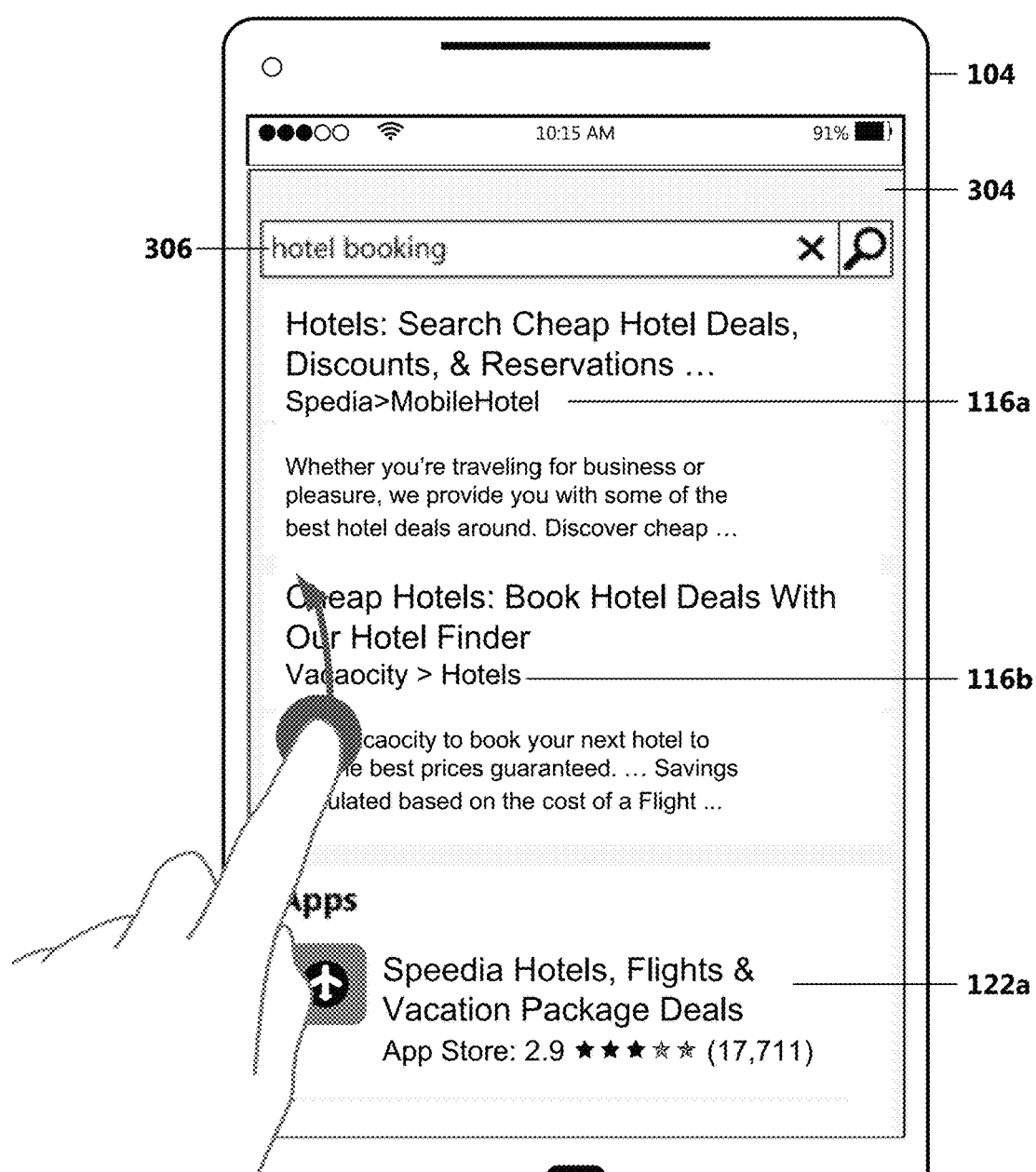
FIGS. 3B and 3C are illustrations showing example user interface displays including a delivery of web resources and apps as search results.
Figure 3C:
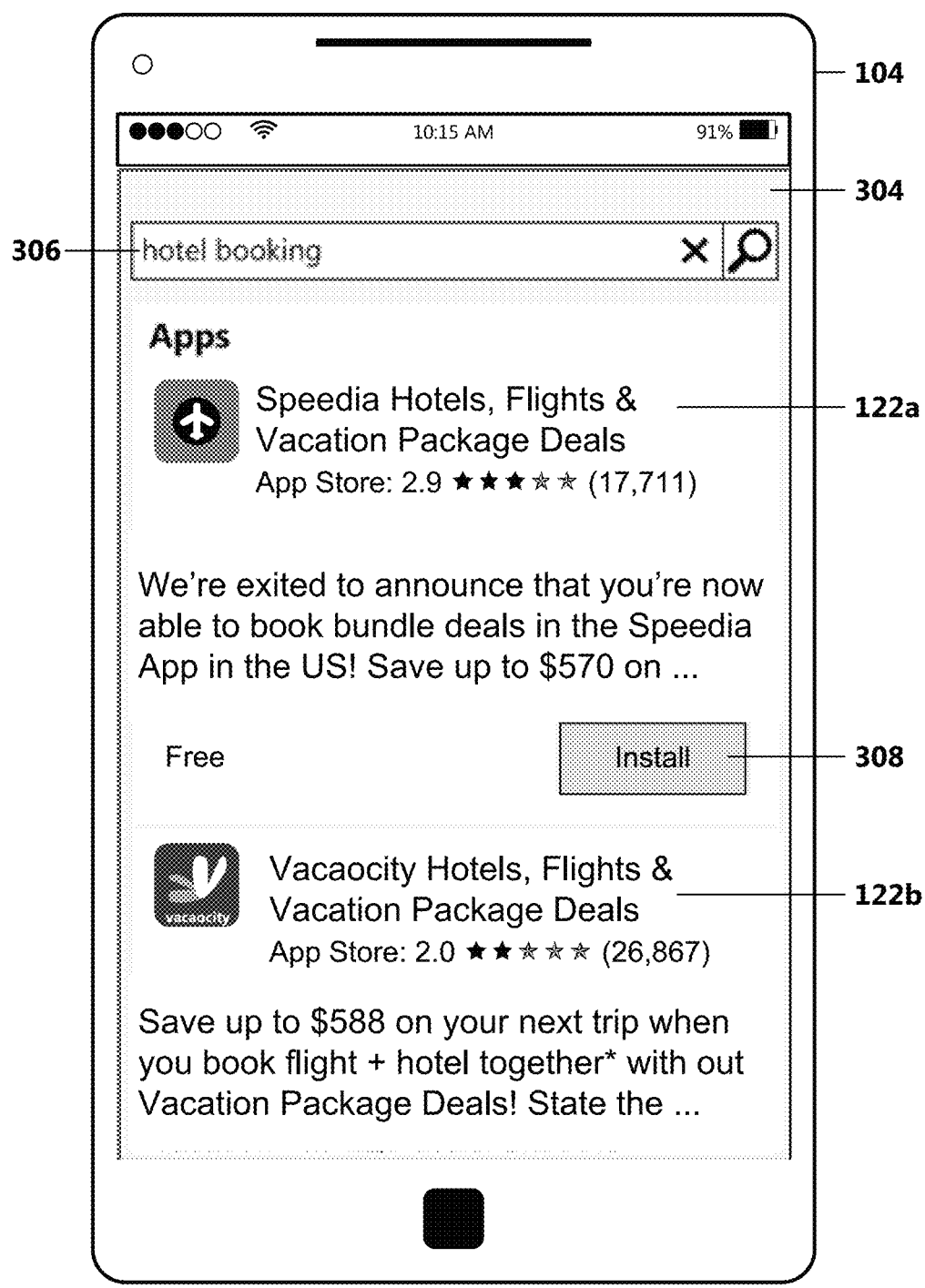

FIGS. 3B and 3C are illustrations of an application user interface 118 including an example search engine UI 304 displayed on a mobile computing device 104 screen by a browser application 102. Using aspects of the present disclosure, upon receiving a <hotel booking> query 306, the search engine 112 locates web resources 116a,b in the index 118 that are responsive to the query, which the search engine 112 provides as search results. According to an example, the web resources 116a,b are non-noisy and non-webpage file child resources having deep link URLs, and are stamped or tagged with UAIDs by the application link engine 114. Accordingly, the search engine 112 is operative to classify the query as an app-intent query, and via the UAIDs, provide app resource results including apps 122a,b. In some examples, an install option 308 is provided, which when actuated, downloads the app to the user's computing device 104.

Figure 4:
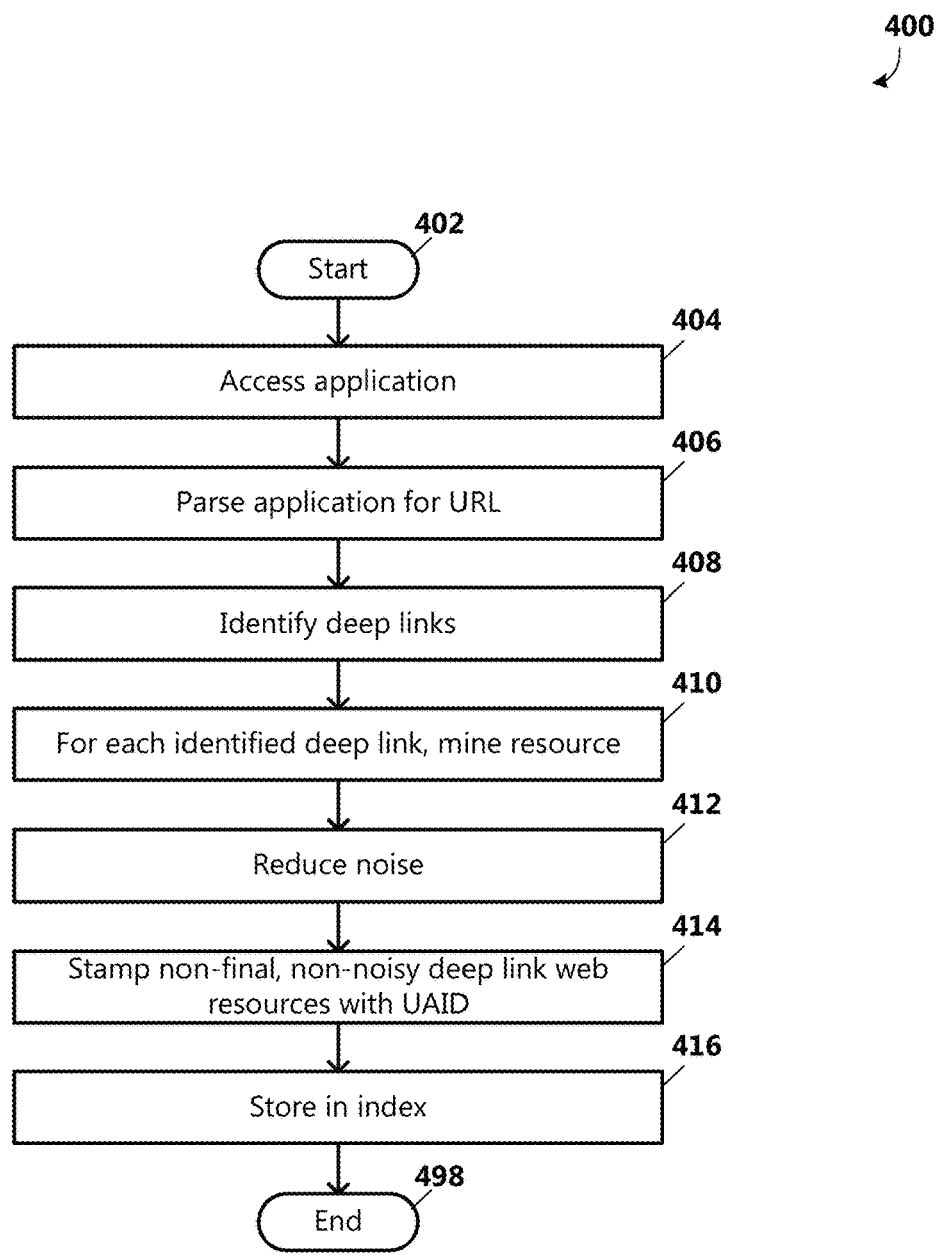
FIG. 4 is a flow chart showing general stages involved in an example method for providing automated discovery and linking of an app to a related web resource for improved delivery of apps as a search result.

FIG. 4 is a flow chart showing general stages involved in an example method 400 for providing automated discovery and linking of an app 122 to a related web resource 116 for improved delivery of apps as search results. Method 400 begins at OPERATION 402, and proceeds to OPERATION 404, where the application linking engine 114 accesses an app 122, for example, via a web crawl or by searching an app store database 120.

At OPERATION 406, the app data are parsed and indexed. According to an example, the app data include at least a UAID and a URL associated with a developer (or deployer) website. According to an aspect, the URL is a homepage URL. The parsed data are stored in the index 118.

The method 400 proceeds to OPERATION 408, where deep links associated with the homepage URL in the app data are identified. In some examples, the application linking engine 114 identifies NAV links 302 for subpages of the website for identifying deep links. In other examples, the application linking engine 114 uses web metadata to identify deep links. For example, the application linking engine 114 goes inside each child link, and identifies deep link resources that are not final pages (e.g., webpage files, such as an HTML files or HTML files including scripts), but rather a directory within the given domain.

The method 400 proceeds to OPERATION 410, where the application linking engine 114 mines each identified deep link resource (that is not a webpage file) for data, and at OPERATION 412, noisy resources are determined based on the mined data. For example, deep link web resources 116 that include predetermined noisy words are determined to be noisy resources. According to an aspect, weight factors are applied to noisy words based on a rate of occurrence and location of the word, and a score is calculated for the resource 116. The determination of whether a resource is noisy may be based on whether the score exceeds a predetermined threshold score.

The method 400 proceeds to OPERATION 414, where the identified deep link, non-final, non-noisy web resources 116 are stamped or tagged with the UAID parsed at OPERATION 406. The tagged resource 116 is then stored in the index 118 at OPERATION 416. The method 400 ends at OPERATION 498.

Figure 5:
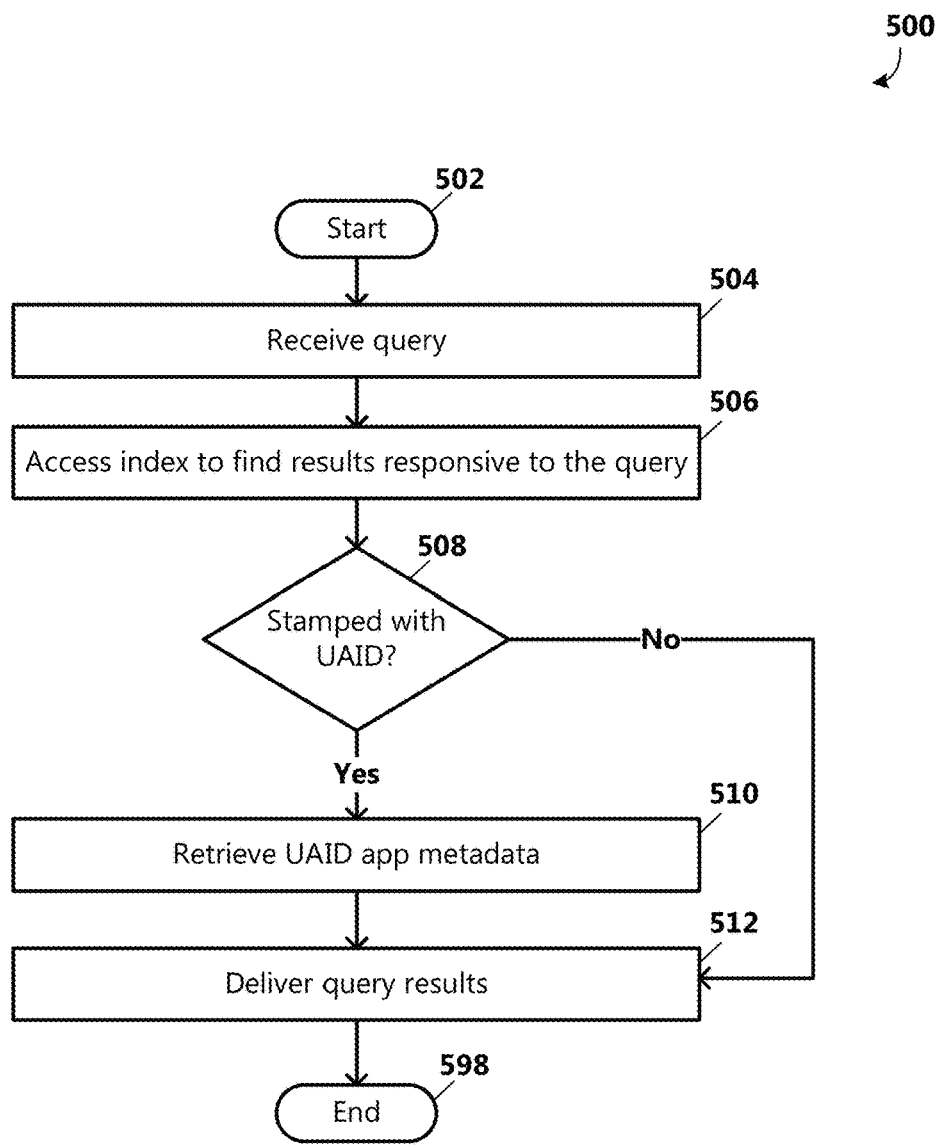
FIG. 5 is a flow chart showing general stages involved in an example method for providing automated classification of an implicit query as an app-intent query.

FIG. 5 is a flow chart showing general stages involved in an example method 500 for providing automated classification of an implicit query as an app-intent query for improved delivery of apps 122 as search results. Method 500 begins at OPERATION 502, and proceeds to OPERATION 504, where an implicit query 306 is received.

The method 500 proceeds to OPERATION 506, where the index 118 is access to find results responsive to the query. At OPERATION 508, for each web resource result, a determination is made as to whether a web resource result is stamped or tagged with a UAID. When a determination is made that the web resource result is stamped or tagged with a UAID, the method 500 proceeds to OPERATION 510, where metadata of the app 122 associated with the UAID are retrieved.

At OPERATION 512, the metadata are provided in the query results, thus providing one or more app results. The method 500 ends at OPERATION 598.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
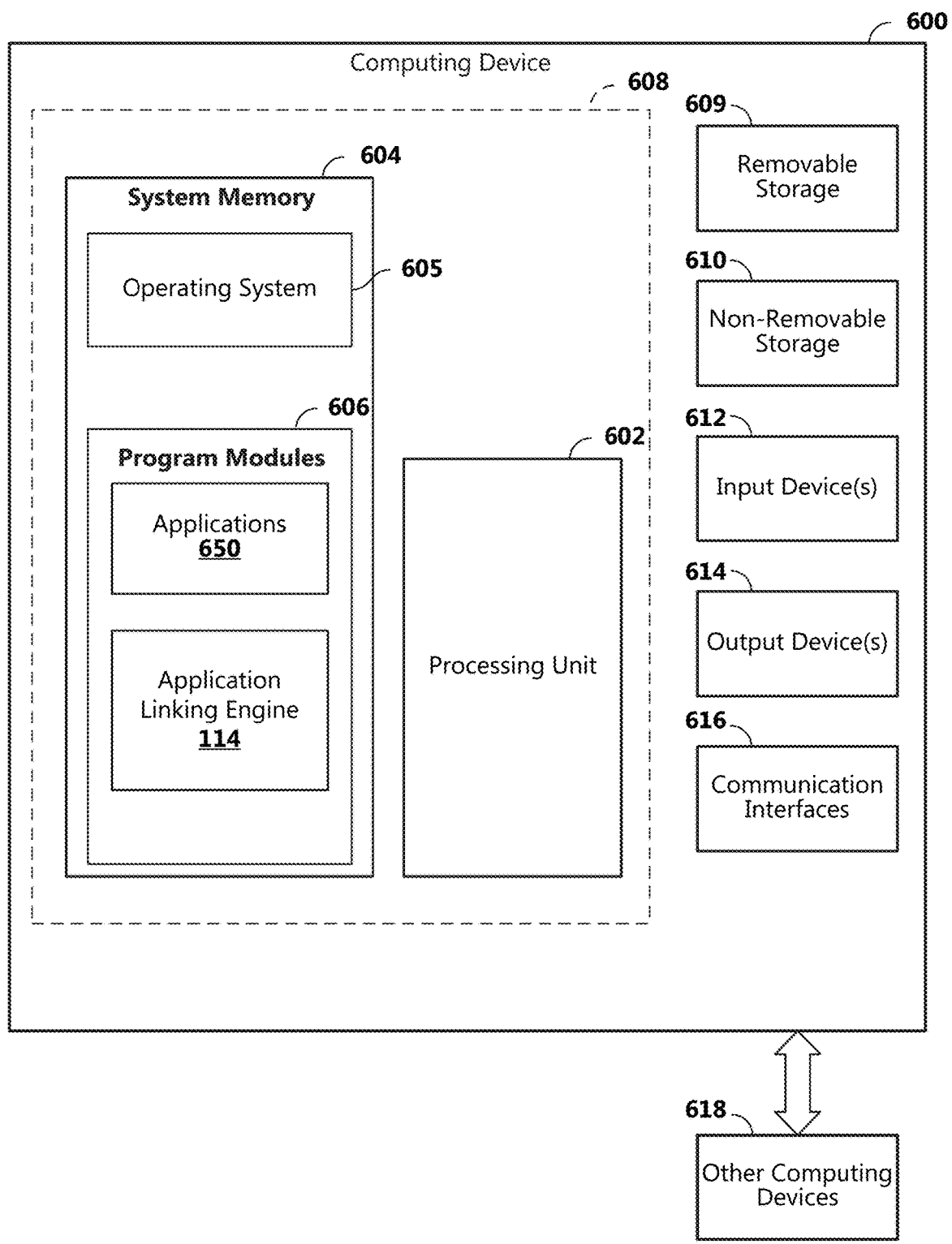
FIG. 6 is a block diagram illustrating example physical components of a computing device.
Figure 7A:
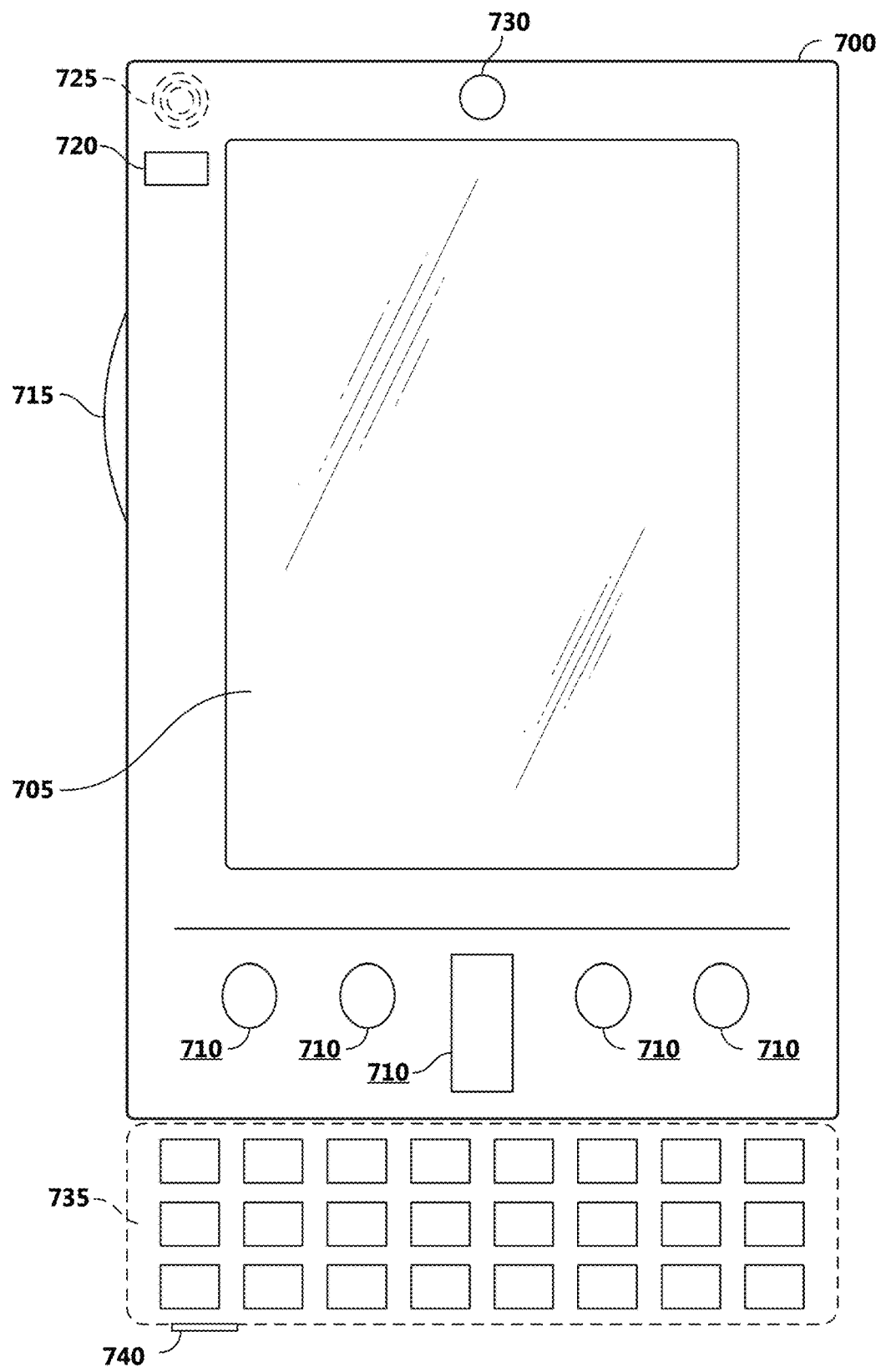
FIGS. 7A and 7B are block diagrams of a mobile computing device.
Figure 7B:
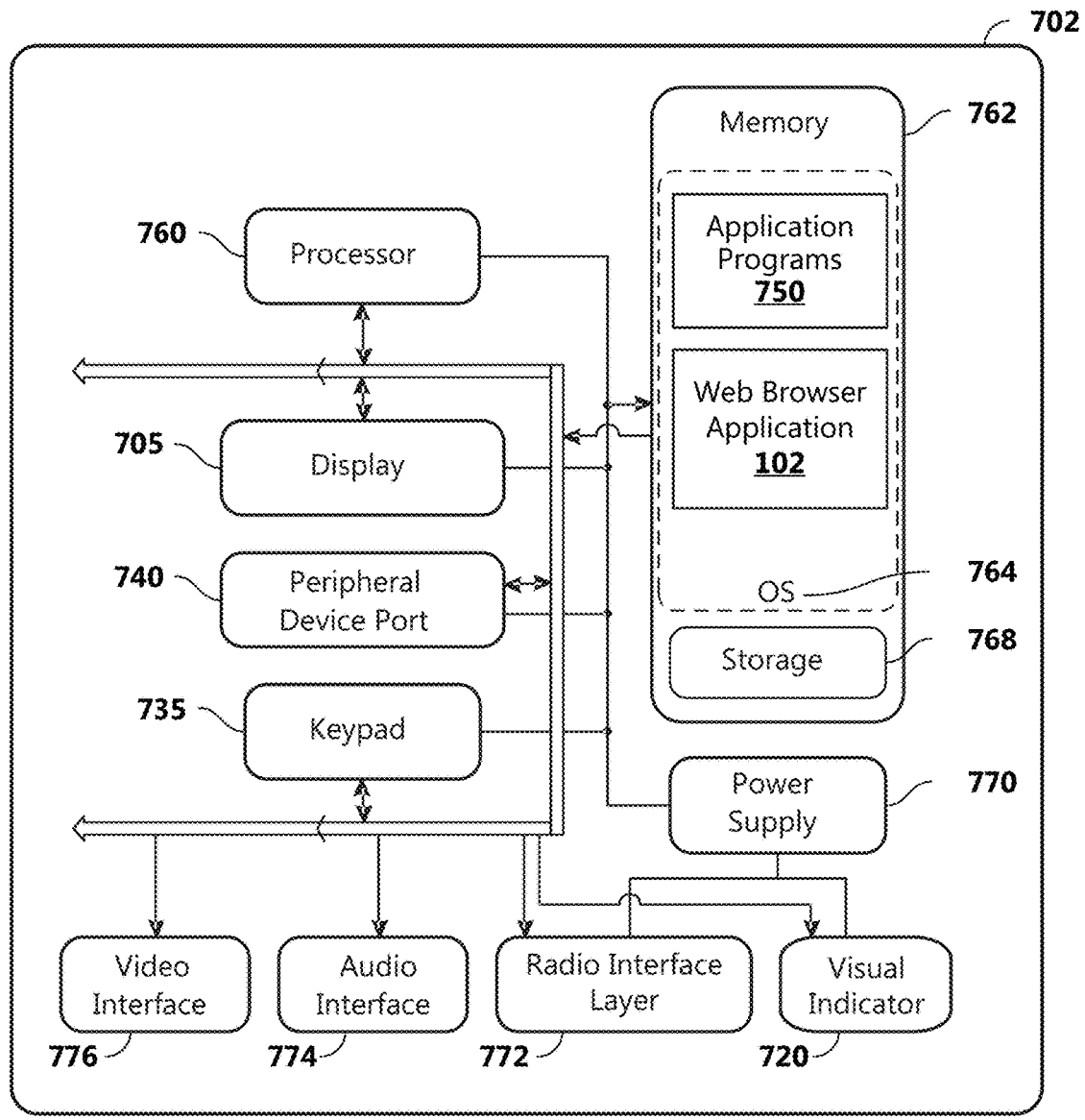

FIGS. 6, 7A, and 7B and the associated descriptions provide a discussion of a variety of operating environments in which examples are practiced. However, the devices and systems illustrated and discussed with respect to FIGS. 6, 7A, and 7B are for purposes of example and illustration and are not limiting of a vast number of computing device configurations that are used for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes an application linking engine 114. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., an application linking engine 114) perform processes including, but not limited to, one or more of the stages of the methods discussed herein. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, a web browser application 102 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 are stored locally on the mobile computing device 700, as described above. According to another aspect, the data are stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated such data/information are accessible via the mobile computing device 700 via the radio 772 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing improved delivery of applications as search results, comprising:
   automatically associating a deep link web resource with an application by:
      accessing the application;
      parsing application data for an associated unique application identifier and a URL of a homepage of a website related to the application;
      storing the unique application identifier and the URL in association with the application in an index;
      identifying the deep link web resource associated with the URL, wherein the deep link web resource is a non-noisy internal page of the website that includes a path;
      tagging the identified deep link web resource with the unique application identifier; and
      storing the unique application identifier tag as metadata associated with the deep link web resource in the index;
   receiving an implicit query for web resources that does not specify whether applications are to be returned as part of a query result; and
   in response to a determination that at least one web resource responsive to the implicit query is the deep link web resource, classifying the implicit query as an app-intent query and providing the application as part of the query result by:

identifying the unique application identifier from the unique application identifier tag stored as metadata associated with the deep link web resource in the index; and determining the application to provide as part of the query result based on the stored association of the unique application identifier and the application in the index.

2. The method of claim 1, wherein identifying the deep link web resource comprises:

identifying a subpage under the homepage of the website related to the application as the internal page; and identifying the subpage as the deep link web resource.

3. The method of claim 2, wherein identifying the subpage comprises:

identifying a navigation link associated with the URL; and identifying the navigation link as the subpage.

4. The method of claim 1, wherein identifying the deep link web resource comprises:

using the URL to navigate to the homepage;

identifying a child link associated with a child resource of the homepage;

navigating to the child resource;

determining whether the child resource is a final page; and when the child resource is not a final page, identifying the child link associated with the child resource as the deep link web resource.

5. The method of claim 4, wherein determining whether the child resource is a final page comprises determining whether the child resource is a Hypertext Markup Language file or a Hypertext Markup Language file including one or more scripts.

6. The method of claim 1, further comprising:

mining the identified deep link web resource to determine the identified deep link web resource is non-noisy.

7. The method of claim 1, wherein accessing the application comprises:

accessing the application via a web crawl; or accessing the application via a search of an application store database.

8. A system for providing improved delivery of applications as search results, the system comprising a computing device, the computing device comprising:

at least one processing device; and at least one computer readable data storage device storing instructions that, when executed by the at least one processing device, enable the computing device to:

automatically associate a deep link web resource with an application by:

accessing the application;

parsing application data for an associated unique application identifier and a URL of a homepage of a website related to the application;

storing the unique application identifier and the URL in association with the application in an index;

identifying the deep link web resource associated with the URL, wherein the deep link web resource is a non-noisy internal page of the website that includes a path;

tagging the identified deep link web resource with the unique application identifier; and storing the unique application identifier tag as metadata associated with the deep link web resource in the index;

receive an implicit query for web resources that does not specify whether applications are to be returned as part of a query result; and in response to a determination that at least one web resource responsive to the implicit query is the deep link web resource, classify the implicit query as an app-intent query and provide the application as part of the query result by:

identifying the unique application identifier from the unique application identifier tag stored as metadata associated with the deep link web resource in the index; and determining the application to provide as part of the query result based on the stored association of the unique application identifier and the application in the index.

9. The system of claim 8, wherein in identifying the deep link web resource, the system is operative to:

identify a subpage under the homepage as the internal page; and identify the subpage as the deep link web resource.

10. The system of claim 9, wherein in identifying the subpage, the system is operative to:

identify a navigation link associated with the homepage; and identify the navigation link as the subpage.

11. The system of claim 8, wherein in identifying the deep link web resource, the system is operative to:

use the URL to navigate to the homepage;

identify a child link associated with a child resource of the homepage;

navigate to the child resource;

determine whether the child resource is a final page; and when the child resource is not a final page, identify the child link associated with the child resource as the deep link web resource.

12. The system of claim 11, wherein a final page is a Hypertext Markup Language file or a Hypertext Markup Language file including one or more scripts.

13. The system of claim 8, wherein the system is further operative to:

mine the identified deep link web resource to determine the identified deep link web resource is non-noisy based at least in part on keywords mined from the identified deep link web resource.

14. Computer storage media including instructions, which when executed by a processor perform a method to improve delivery of applications as search results, comprising:

automatically associating a deep link web resource with an application by:

accessing the application;

parsing application data for an associated unique application identifier and a URL of a homepage of a website related to the application;

storing the unique application identifier and the URL in association with the application in an index;

identifying the deep link web resource associated with the URL, wherein the deep link web resource is a non-noisy internal page of the website that includes a path;

tagging the identified deep link web resource with the unique application identifier; and storing the unique application identifier tag as metadata associated with the deep link web resource in the index;

receiving an implicit query for a web resource that does not specify whether applications are to be returned as part of a query result; and in response to a determination that at least one web resource responsive to the implicit query is the deep link web resource, classifying the implicit query as an app-intent query and providing the application as part of the query result by:

identifying the unique application identifier from the unique application identifier tag stored as metadata associated with the deep link web resource in the index; and determining the application to provide as part of the query result based on the stored association of the unique application identifier and the application in the index.

15. The computer storage media of claim 14, wherein in identifying the deep link web resource, the instructions further comprising:

identifying a subpage under the homepage as the internal page; or identifying a navigation link associated with the homepage; and identifying the navigation link as the deep link web resource; or using the URL to navigate to the homepage;

identifying a child link associated with a child resource of the homepage;

navigating to the child resource;

determining whether the child resource is a final page; and when the child resource is not a final page, identifying the child link associated with the child resource as the deep link web resource.

16. The computer storage media of claim 14, wherein the instructions further comprising:

mining the identified deep link web resource to determine the identified deep link web resource is non-noisy based at least in part on keywords mined from the identified deep link web resource.

* * * * *